United States Patent
Melara

(10) Patent No.: US 6,615,448 B2
(45) Date of Patent: Sep. 9, 2003

(54) SELF-ORIENTATING TWIN CASTOR OF THE TYPE COMPRISING A PAIR OF COAXIAL WHEELS

(75) Inventor: Francescantonio Melara, Bologna (IT)

(73) Assignee: Emilsider Meccanica S.p.A., Cadriano di Granarolo Emilia (IT)

( * ) Notice: Subject to any disclaimer, the term of this patent is extended or adjusted under 35 U.S.C. 154(b) by 0 days.

(21) Appl. No.: 09/730,760
(22) Filed: Dec. 7, 2000
(65) Prior Publication Data
US 2001/0039693 A1 Nov. 15, 2001

(30) Foreign Application Priority Data
Dec. 24, 1999 (IT) .......................... B099A0711

(51) Int. Cl.⁷ ............................................. B60B 33/00
(52) U.S. Cl. ..................................... 16/35 R; 188/1.12
(58) Field of Search ..................... 16/35 R, 44, 18 R; D8/375; 188/1.12

(56) References Cited

U.S. PATENT DOCUMENTS

| | | | | | |
|---|---|---|---|---|---|
| 4,077,088 A | * | 3/1978 | Melara | ........................... | 16/47 |
| 4,212,092 A | * | 7/1980 | Ferrari | ........................... | 16/35 R |
| 4,219,904 A | * | 9/1980 | Melara | ........................... | 16/44 |
| 4,290,166 A | * | 9/1981 | Melara | ........................... | 16/47 |
| 4,455,707 A | * | 6/1984 | Screen | ........................... | 16/35 R |
| 4,821,369 A | * | 4/1989 | Daniels | ........................... | 16/35 R |
| 5,119,525 A | * | 6/1992 | Melara | ........................... | 16/18 R |
| 5,355,550 A | * | 10/1994 | Yang | ........................... | 16/35 R |
| 5,537,715 A | * | 7/1996 | Yang | ........................... | 16/35 R |
| 5,617,934 A | * | 4/1997 | Yang | ........................... | 16/35 R |
| 6,092,262 A | * | 7/2000 | Lin | ........................... | 16/35 R |
| 6,256,835 B1 | * | 7/2001 | Wang | ........................... | 16/35 R |

FOREIGN PATENT DOCUMENTS

| | | |
|---|---|---|
| DE | 31 31 475 | 4/1983 |
| EP | 0 458 446 | 11/1991 |
| EP | 0 645 262 | 3/1995 |
| FR | 2 365 450 | 4/1978 |
| FR | 2 376 003 | 7/1978 |

* cited by examiner

Primary Examiner—Anthony Knight
Assistant Examiner—Doug Hutton
(74) Attorney, Agent, or Firm—Guido Modiano; Albert Josif; Daniel O'Byrne

(57) ABSTRACT

A self-orientating twin castor of the type that comprises: a supporting body, having a substantially vertical wall; a slot, vertically elongated and passing through the wall; a shaft, driven through the slot; a pair of wheels associated with the opposite ends of the shaft; a vertical receptacle, which is provided in the wall and is axially offset with respect to the shaft; a pivot, being rotatable in the receptacle for connecting the castor to a piece of furniture; two tubular portions, which protrude from opposite sides of the vertical wall and are substantially coaxial to the shaft; a substantially vertical hole, which is provided in the wall above the slot and is connected thereto; a spring, accommodated in the hole and acting on the shaft; the hole being open upwards and closed by a closure element which acts as abutment for the spring.

11 Claims, 4 Drawing Sheets

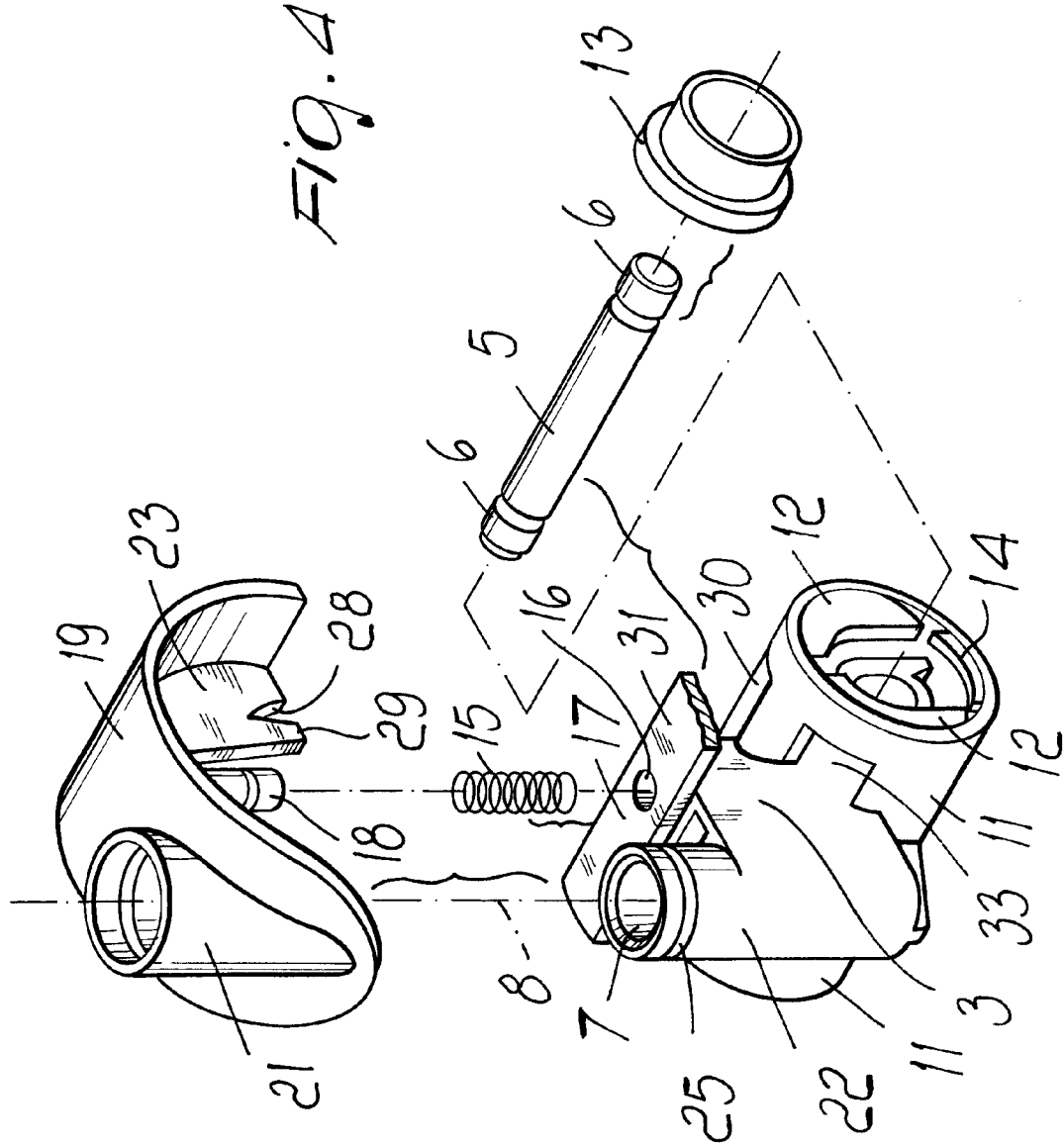

SELF-ORIENTATING TWIN CASTOR OF THE TYPE COMPRISING A PAIR OF COAXIAL WHEELS

BACKGROUND OF THE INVENTION

The present invention relates to a self-orientating twin castor of the type comprising a pair of coaxial wheels.

Such castors are fitted to chairs and pieces of furniture. In particular for fitting to chairs, castors are also known having a braking system which is activated when the user rises from the chair and therefore no longer bears with his weight on the castors.

The operation of the braking system complies with safety criteria and its purpose is to brake the movement of the chair away from its position of use when the user is about to sit on it.

From U.S. Pat. No. 4,290,166 by the same Applicant, a wheel braking device, is known, which relates to this type of castor, for example. In this device, a spring is inserted, from below, in a vertical seat of the part that constitutes the castor support, so that it can act, with its lower end, on a shaft which supports, at its opposite ends, the two wheels of the castor. When the chair is not being used, the shaft is raised in a position in which the wheels abut against elements of the support suitable to prevent their rotation. Although the introduction of this type of castor is to be considered as an important improvement in this particular sector, there are still functional problems suffered by these devices.

In castors of the self-orientating type there is the certainly known problem of the collection of dust, dirt in general and other hard-to-remove materials between the wheels and the rotation shaft on which said wheels are fitted. This rather frequent drawback inevitably causes a deterioration of the internal components of the castor and significantly increases friction between the rotating elements to the point of preventing the rotation of the wheels.

Another problem suffered by all castors with twin wheels is that the wheels, when loaded, tend to assume a diverging arrangement due to elastic deformation. The consequence of this deformation is that the braking elements fitted inside the castor tend to rub against other parts of the castor and particularly affect the internal ribs designed to retain said braking elements in their working seats.

Another problem of twin castors in general is due to the use of lubricant in order to allow smooth wheel rotation. Even if said lubricant is dense, it tends to flow out of the castor and therefore soil the floor or, worse still, carpets and moquette.

SUMMARY OF THE INVENTION

The aim of the present invention is therefore to provide a self-orientating castor with twin wheels produced by molding plastic material which is capable of maintaining durable and effective operation and in particular prevents accumulation of dust or debris inside it.

Within the scope of this aim, an object of the present invention is to provide a self-orientating castor having a more effective braking system than that achieved in conventional castors.

Another object is to provide a self-orientating castor which has a simple and sturdy structure, allows rapid assembly and does not require particularly complicated molds, so as to be economically advantageous to manufacture.

This aim and these and other objects which will become better apparent hereinafter are achieved by the present self-orientating twin castor of the type that comprises: a supporting body, having a substantially vertical wall; a slot, vertically elongated and passing through said wall; a shaft, driven through said slot; a pair of wheels associated with the opposite ends of said shaft; a vertical receptacle, which is provided in said wall and is axially offset with respect to said shaft; a pivot, being rotatable in said receptacle for connecting the castor to a piece of furniture; two tubular portions, which protrude from opposite sides of said vertical wall and are substantially coaxial to said shaft; a substantially vertical hole, which is provided in said wall above said slot and is connected thereto; a spring, accommodated in said hole and acting on said shaft; characterized in that said hole is open upward and is closed by a closure element which acts as abutment for said spring.

BRIEF DESCRIPTION OF THE DRAWINGS

Further characteristics and advantages will become better apparent from the following detailed description of a preferred non-exclusive embodiment of a self-orientating twin castor according to the invention, illustrated only by way of non-limitative example in the accompanying drawings, wherein:

FIG. 4 is an exploded perspective view of the castor shown in the preceding figures.

DESCRIPTION OF THE PREFERRED EMBODIMENTS

Figure 1:
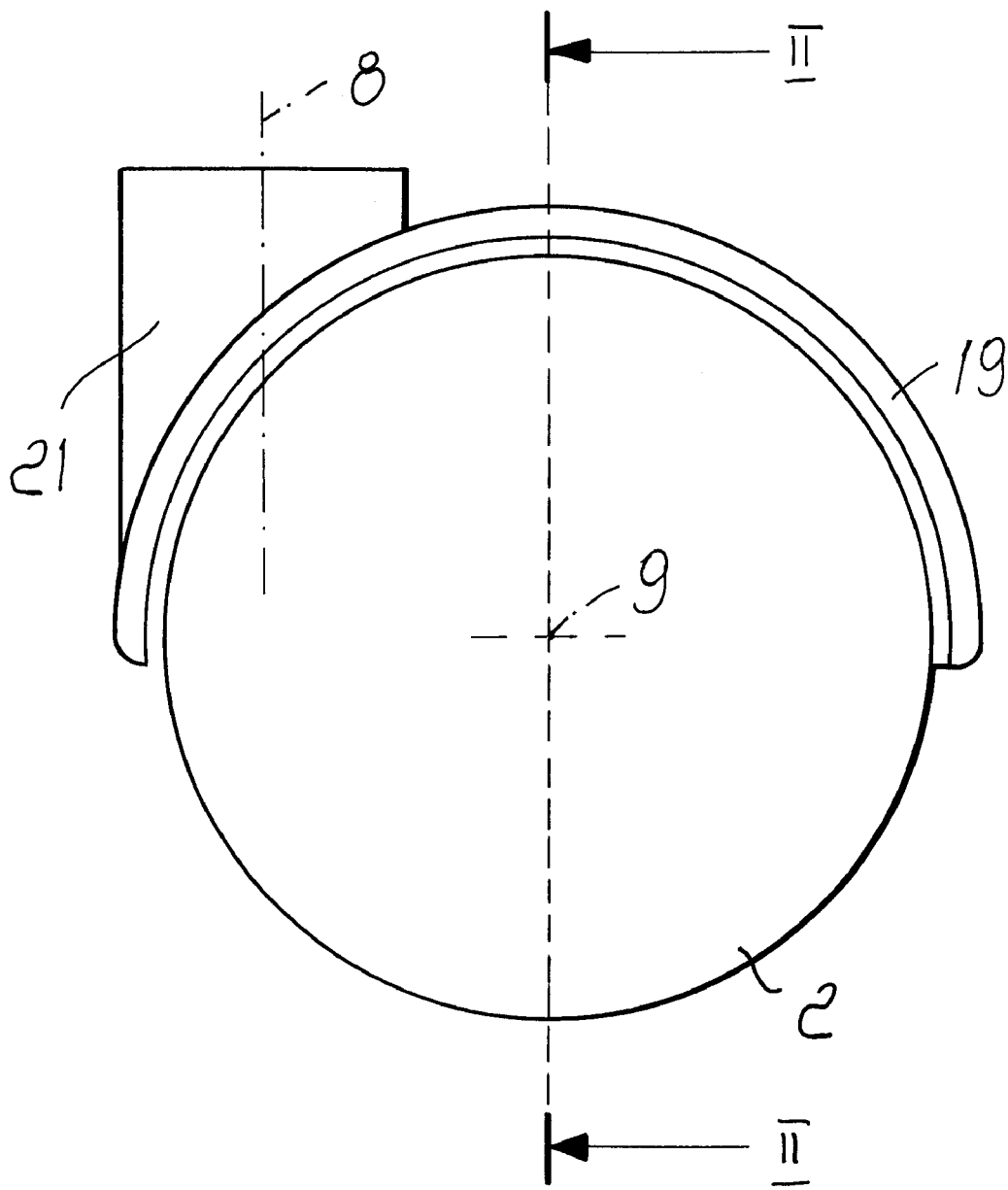
FIG. 1 is a side view of the castor according to the invention.

With reference to the figures, the reference numeral 1 generally designates a self-orientating twin castor comprising a supporting body which is substantially constituted by a wall 3 which, once the assembly of the castor has been completed, is interposed between a pair of coaxial wheels 2 provided with internal bushes 2a.

A horizontally elongated through hole or slot 4 is provided in the wall 3, and a horizontal shaft 5 is supported therein. The wheels 2 are mounted at the opposite ends 6 of the shaft 5. The wheels are retained axially through engagement of an annular protrusion 2b, provided inside the bushes 2a, in an annular groove 5a of the shaft 5.

A vertical receptacle 7 is provided in the wall 3 and is axially offset with respect to the shaft 5. The axis 8 of the receptacle 7 is offset and perpendicular with respect to the axis 9 of the shaft 5. The receptacle 7 internally accommodates a rotatable pivot 10 for connecting the castor 1 to a piece of furniture, a chair or the like.

Two tubular portions 11 protrude from the opposite sides of the vertical wall 3 coaxially to the shaft 5. Two vertical ribs 12 are provided inside the opposite ends of the tubular portions 11, and a collar 13, superimposed on the bushes 2a, engages between said ribs 12. The vertical ribs 12 inside the tubular portions 11 engage the collar 13 in lateral positions, so as to minimize the edge friction that the collar 13 tends to produce due to the elastic deformation that the wheel undergoes when loaded.

A rim 14 protrudes inwards from the lower edge of the tubular portions 11 and extends along an arc on the plane of the vertical ribs 12 and between said ribs.

The castor 1 has a braking device composed of a spring 15 which is accommodated in a vertical hole 16 of the wall 3 and is parallel to the axis 8 of the vertical receptacle 7 of the wheel. The vertical hole 16 connects the upper face 17 of the wall 3 to the hole 4, so that the spring 15 can be inserted from above in the vertical hole 16.

The spring 15 acts, with its lower end, on the shaft 5 and, with its upper end, against a closure plug 18 which is inserted with a push-fit coupling in the vertical hole 16 so as to keep the spring 15 in a compressed state.

The plug 18 is rigidly coupled to a substantially semicylindrical fairing 19 which is concentric to the wheels 2 and from which a tubular tang 21 protrudes; said tang 21 is superimposed on the sleeve 22 which is formed as an extension of the receptacle 7.

The fairing 19 is stiffened by a ridge 23 which lies on the central plane of the castor and is formed in the lower face of the fairing between the plug 18 and the rear end of said fairing.

The fairing 19 is fixed to the wall 3 not only by a first collar 24, which lies inside the vertical hole 16 and engages an annular seat 26 of the plug 18, but also by a second collar 25, which lies inside the tubular tang 21 and engages an annular seat 27 of the sleeve 22.

The ridge 23 has, proximate to the plug 18, a notch 28 which defines a tooth 29.

When the plug 18 is inserted in the vertical hole 16, the tooth 29 enters an opening 30 provided in an upward region of the tubular portions 11, while the edge of the opening 30 engages in the notch 28.

The castor 1 is completed by two wings 31 which are arranged laterally to the wall 3, are coplanar to the upper face 17 of the wall 3, and have a cylindrical surface which is concentric with respect to the axis 9 of the tubular portions 11. The distance of the wings 31 from the axis 9 is substantially equal to the internal radius of the annular band 32 that circumferentially delimits the wheels 2 and constitutes their rolling surface.

Figure 2:
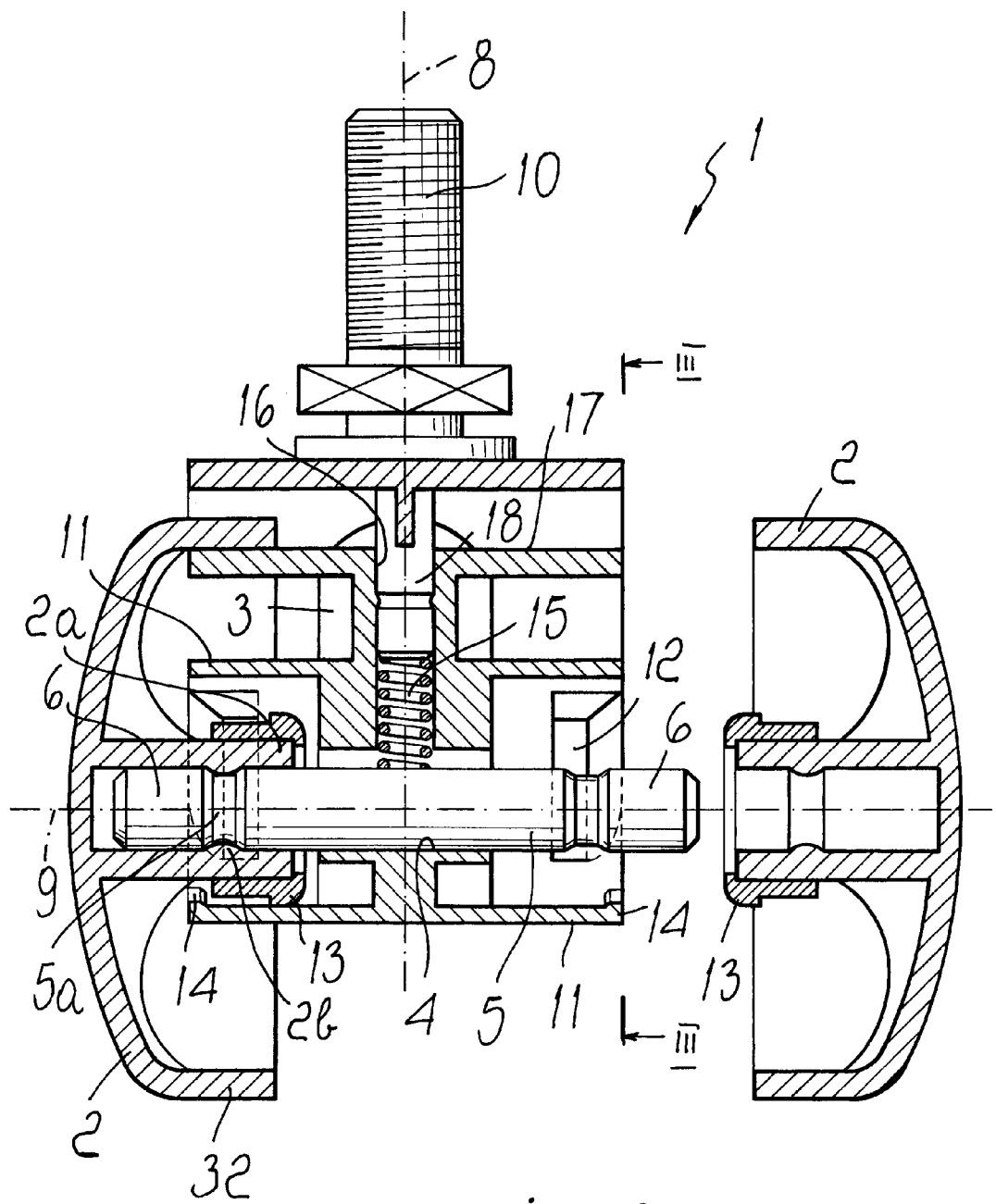
FIG. 2 is a sectional view, taken along the line II—II of FIG. 1.

In the assembled condition, the wheel is as shown in FIG. 2, in which the collars 13, by engaging behind the vertical ribs 12, retain the wheels 2 even in case of divergence due to the load.

When the castor is not loaded, the spring 15 keeps the shaft 5 rested against the lower surface of the hole 4. In this position, the wings 31 are in contact with the inner face of the annular band 32 of the wheels, while the collar 13 is simultaneously in contact with the inner face of the annular portions 11. In this way, an effective braking action is provided on the wheels and is also facilitated by a certain elasticity of the wings 31.

In a situation in which the castor is loaded, the spring 15 is compressed and the shaft 5 rises, causing the separation of the wings 31 from the band 32 and of the collars 13 from the tubular portions 11. In this manner, the wheels 12 can turn freely.

An important advantage of the castor according to the invention is the vertical arrangement of the ribs 12, which allows to form the undercuts by molding plastic material and by providing in the mold inserts which can be removed through the opening 30 and a further opening 33 formed in the tubular portions 11.

Another considerable advantage of the castor of the invention is the provision of the vertical hole 16 which, by being open upward, leaves the tubular portions 11 closed in a downward region, so as to prevent lubricant from falling under the castor, while the rim 14 prevents the escape of said lubricant from the opposite ends of the tubular portions 11.

Numerous modifications and variations are possible in the practical embodiment of the invention, and all are within the scope of the appended claims. For example, the fairing may not have the plug 18 and may be retained on the support by the simple application of the tubular tang 21 on the sleeve 22. In this case, the plug can be constituted by a simple pin or screw.

Figure 3:
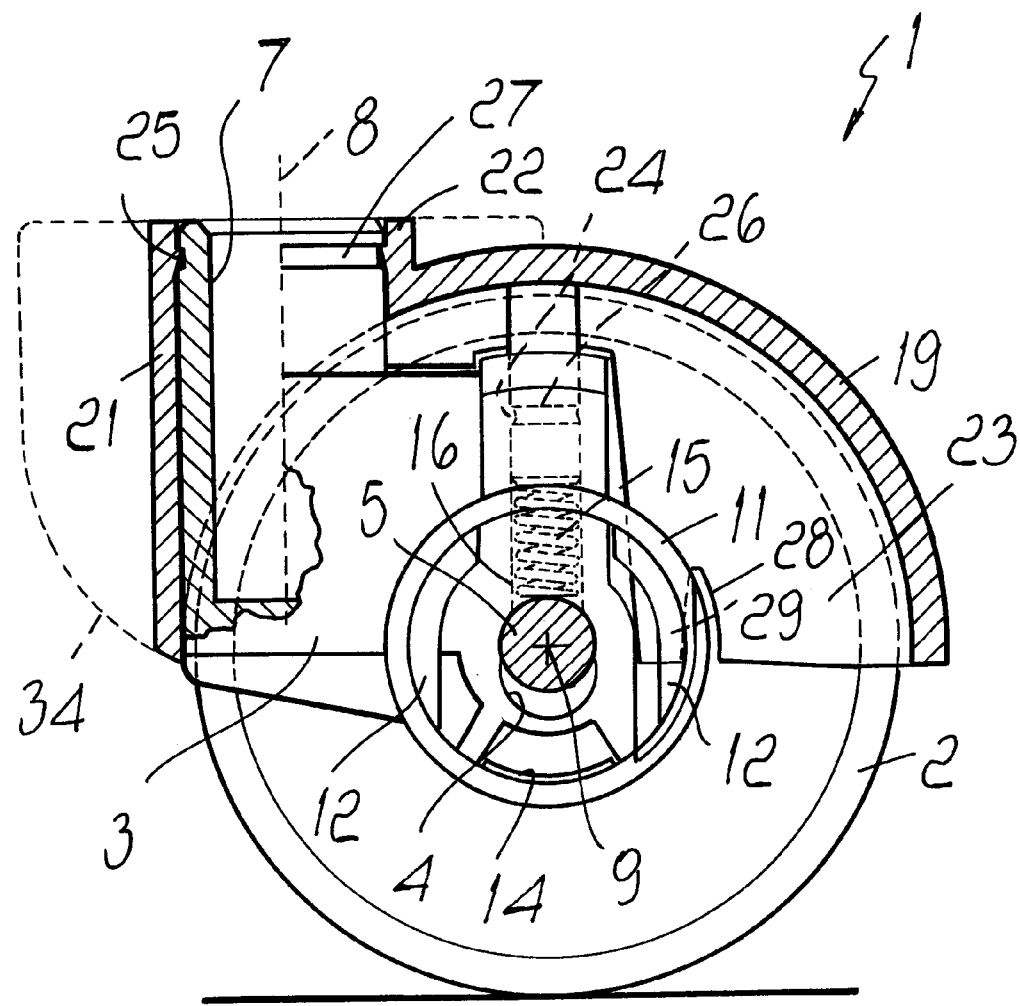
FIG. 3 is a sectional side view, taken along the line III—III of FIG. 2.

In a further embodiment, a front piece 34 (shown in dashed lines in FIG. 3) is formed on the fairing and extends around said tubular tang 21 in order to adapt the fairing to the aesthetic requirements of the piece of furniture to which the castor is to be associated.

The disclosures in Italian Patent Application No. BO99A000711 from which this application claims priority are incorporated herein by reference.

What is claimed:

1. A self-orientating twin castor comprising: a supporting body, having a substantially vertical wall; a slot, horizontally elongated and passing through said wall; a shaft, driven through said slot; a pair of wheels associated with the opposite ends of said shaft; a vertical receptacle, which is provided in said wall and is axially offset with respect to said shaft; a pivot, being rotatable in said receptacle for connecting the castor to a piece of furniture; two tubular portions, which protrude from opposite sides of said vertical wall and are substantially coaxial to said shaft; a substantially vertical hole, provided in said wall, above said slot and being connected thereto; a spring, accommodated in said hole and acting on said shaft; and a closure element which acts as an abutment for said spring, said hole being open upwards and closed by said closure element, said closure element being constituted by a plug, rigidly coupled to a fairing, which is substantially concentric to said wheels.

2. The twin castor of claim 1, further comprising, inside each end of the tubular portions, two vertical ribs, a collar engaged therebetween, and bushes for supporting said wheels on said shaft, said collar being formed on said bushes.

3. The castor of claim 2, further comprising a rim protruding inwards from a lower edge of said tubular portions, so as to trace a circular arc between said ribs.

4. The castor of claim 3, comprising an annular band that constitutes the rolling surface of said wheels, and two wings protruding laterally outwards from said wall, for engaging, under elastic thrust of said spring, an inner face of said annular band.

5. The castor of claim 4, wherein said tubular portions have, in an upward region thereof, openings allowing fabrication of said castor in a mold by positioning inserts of the mold which are suitable to define undercuts formed by said ribs.

6. The twin castor of claim 1, wherein said fairing has a front piece which runs around a tubular tang.

7. A self-orientating twin castor comprising: a supporting body, having a substantially vertical wall; a slot, horizontally elongated and passing through said wall; a shaft, driven through said slot; a pair of wheels associated with the opposite ends of said shaft; a vertical receptacle, which is provided in said wall and is axially offset with respect to said shaft; a pivot, being rotatable in said receptacle for connecting the castor to a piece of furniture; two tubular portions, which protrude from opposite sides of said vertical wall and are substantially coaxial to said shaft; a substantially vertical hole, provided in said wall, above said slot and being connected thereto; a spring, accommodated in said hole and acting on said shaft; and a closure element which acts as an abutment for said spring, said hole being open upwards and closed by said closure element, two vertical ribs being provided inside each end of the tubular portions, a rim protruding inwards from a lower edge of said tubular portions, so as to trace a circular arc between said ribs, and wherein said closure element is constituted by a plug, rigidly coupled to a fairing, which is substantially concentric to said wheels.

8. The twin castor of claim 7, further comprising a collar engaged between said ribs, and bushes for supporting said wheels on said shaft, said collar being formed on said bushes.

9. The castor of claim 7, comprising an annular band that constitutes the rolling surface of said wheels, and two wings protruding laterally outwards from said wall, for engaging, under elastic thrust said spring, an inner face of said annular band.

10. The castor of claim 9, wherein said tubular portions have, in an upward region thereof, openings allowing fabrication of said castor in a mold by positioning inserts of the mold which are suitable to define undercuts formed by said ribs.

11. The twin castor of claim 7, wherein said fairing has a front piece which runs around a tubular tang.

* * * * *